United States Patent
Amihai et al.

(10) Patent No.: US 11,699,561 B2
(45) Date of Patent: Jul. 11, 2023

(54) SYSTEM FOR MONITORING A CIRCUIT BREAKER

(71) Applicant: ABB Schweiz AG, Baden (CH)

(72) Inventors: Ido Amihai, Bensheim (DE); Aydin Boyaci, Karlsruhe (DE); Ralf Gitzel, Mannheim (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/534,468

(22) Filed: Nov. 24, 2021

(65) Prior Publication Data

US 2022/0165526 A1 May 26, 2022

(30) Foreign Application Priority Data

Nov. 24, 2020 (EP) .................... 20 209 540

(51) Int. Cl.
*H01H 47/00* (2006.01)
*G05B 19/042* (2006.01)

(52) U.S. Cl.
CPC ....... *H01H 47/002* (2013.01); *G05B 19/0428* (2013.01); *H01H 2047/006* (2013.01)

(58) Field of Classification Search
CPC ........... H01H 47/002; H01H 2047/006; H01H 11/0062; H01H 2071/044; G05B 19/0428; G01R 31/3272; G06N 3/08
See application file for complete search history.

(56) References Cited

U.S. PATENT DOCUMENTS

| | | | |
|---|---|---|---|
| 2001/0048375 A1 | 12/2001 | Maruyama et al. | |
| 2004/0189319 A1* | 9/2004 | Stanisic | G01R 31/3272 324/523 |
| 2009/0113049 A1 | 4/2009 | Nasle et al. | |
| 2017/0047181 A1* | 2/2017 | Yang | H01H 3/3005 |
| 2020/0278397 A1* | 9/2020 | Chen | H01H 11/0062 |
| 2022/0052518 A1* | 2/2022 | Matuonto | H02H 7/263 |
| 2022/0202088 A1* | 6/2022 | Bouchuiguir | A24F 40/42 |

FOREIGN PATENT DOCUMENTS

| | | |
|---|---|---|
| CA | 2809786 A1 | 3/2012 |
| CN | 102288879 A | 12/2011 |

\* cited by examiner

*Primary Examiner* — Jermele M Hollington
*Assistant Examiner* — Zannatul Ferdous
(74) *Attorney, Agent, or Firm* — Leydig, Voit & Mayer, Ltd.

(57) ABSTRACT

A system for monitoring a circuit breaker includes: at least one sensor and a processor. The at least one sensor is configured to be located and utilized to obtain at least one sensor data of a main shaft of an operational circuit breaker, and the at least one sensor is configured to provide the at least one sensor data of the main shaft of the operational circuit breaker to the processor. The processor is configured to determine position and/or velocity information for a moveable contact of the operational circuit breaker, where the determination comprises analysis of the at least one sensor data of the main shaft of the operational circuit breaker by a trained neural network implemented by the processor.

16 Claims, 3 Drawing Sheets

SYSTEM FOR MONITORING A CIRCUIT BREAKER

CROSS-REFERENCE TO PRIOR APPLICATION

Priority is claimed to European Patent Application No. EP 20 209 540.2, filed on Nov. 24, 2020, the entire disclosure of which is hereby incorporated by reference herein.

FIELD

One or more embodiments of the present invention may relate to a system for monitoring a circuit breaker, a system for monitoring a two or three phase switchgear or controlgear, a method for monitoring a circuit breaker, a system for training a neural network for monitoring a circuit breaker, and a method for training a neural network for monitoring a circuit breaker.

BACKGROUND

The operating mechanism of a circuit breaker (CB) is one of the main subsystems prone to failure of a switchgear. Most of the mechanical failure modes occurring in the mechanism can be detected by monitoring the travel curve that represents the position of the moving contact. Furthermore, the travel curve may also reveal electrical failure modes like contact ablation.

Today, travel curve monitoring is rarely applied in switchgears.

Furthermore, the existing solutions have following drawbacks:

[1] Most of the today's travel curve monitoring solutions only use the measurement of the main shaft angle and calculate the position of the moving contact by kinematical relationships representing all three poles. Therefore, it cannot be differentiated between the travel curve of the three poles. Thus, it is hard to identify the failure location, e.g. at which pole.

[2] In medium voltage (MV) CBs, the push rod is the preferred measurement location for the travel curve. Therefore, the requirements on the sensor and the needed electrical components for connection are high in the installation space due to the CB design, and the commissioning is very cumbersome. Therefore, only few position sensor solutions come into consideration.

[3] The selected position sensors for travel curve measurements must withstand high impact-like forces due to the switching operations and the resulting shock vibrations which reduce the sensor lifetime. In general, the sensor should reliably measure the travel curve during the CB lifetime.

[1]-[3] are characteristic for position sensors applicable for travel curve measurements in CBs and can only be mitigated by selecting high-end solutions. This typically results in much higher cost making permanent installation unattractive.

There is a need to address these problems.

SUMMARY

One or more embodiments of the present invention may provide a system for monitoring an operational circuit breaker. The system may comprise: at least one sensor; and a processor. The at least one sensor may be configured to be located and utilized to obtain at least one sensor data of a main shaft of the operational circuit breaker. The at least one sensor may be configured to provide the at least one sensor data of the main shaft of the operational circuit breaker to the processor. The processor may be configured to determine position and/or velocity information for a moveable contact of the operational circuit breaker, wherein the determination comprises analysis of the at least one sensor data of the main shaft of the operational circuit breaker by a trained neural network implemented by the processor.

One or more embodiments of the present invention may provide a method for monitoring an operational circuit breaker. The method may comprise: utilizing at least one sensor located to obtain at least one sensor data of a main shaft of the operational circuit breaker; providing the at least one sensor data of the main shaft of the operational circuit breaker to a processor; and determining by the processor position and/or velocity information for a moveable contact of the operational circuit breaker, where the determining may comprise analysing the at least one sensor data of the main shaft of the operational circuit breaker by a trained neural network implemented by the processor.

One or more embodiments of the present invention may provide a system for training a neural network for monitoring an operational circuit breaker. The system may comprise at least one first sensor, at least one second sensor, and a processor. The at least one first sensor may be configured to be located and utilized to obtain at least one sensor data of a main shaft of a calibration circuit breaker. The at least one first sensor may be configured to provide the at least one sensor data of the main shaft of the calibration circuit breaker to the processor. Further, the at least one second sensor may be configured to be located and utilized to obtain at least one sensor data of a moveable contact and/or pushrod of the calibration circuit breaker, and the at least one second sensor may be configured to provide the at least one sensor data of the moveable contact and/or pushrod of the calibration circuit breaker to the processor. The processor may be configured to train a neural network, where the training of the neural network comprises utilization of the at least one sensor data of the main shaft of the calibration circuit breaker and the at least one sensor data of the moveable contact and/or pushrod of the calibration circuit breaker, and where the trained neural network is configured to determine position and/or velocity information for a moveable contact of the operational circuit breaker on the basis of analysis of at least one sensor data of a main shaft of the operational circuit breaker.

One or more embodiments of the present invention may provide a method for training a neural network for monitoring an operational circuit breaker. The method may comprise: utilizing at least one first sensor located to obtain at least one sensor data of a main shaft of a calibration circuit breaker; providing the at least one sensor data of the main shaft of the calibration circuit breaker to a processor; utilizing at least one second sensor located to obtain at least one sensor data of a moveable contact and/or pushrod of the calibration circuit breaker; providing the at least one sensor data of the moveable contact and/or pushrod of the calibration circuit breaker to the processor; and training by the processor a neural network, wherein the training of the neural network comprises utilizing the at least one sensor data of the main shaft of the calibration circuit breaker and the at least one sensor data of the moveable contact and/or pushrod of the calibration circuit breaker, and wherein the trained neural network is configured to determine position and/or velocity information for a moveable contact of the operational circuit breaker on the basis of analysis of at least one sensor data of a main shaft of the operational circuit breaker.

Therefore, it may be advantageous to have an improved technique to monitor a circuit breaker.

An object of one or more embodiments of the present invention may be solved with the subject matter of the independent claims, wherein further embodiments are incorporated in the dependent claims.

BRIEF DESCRIPTION OF THE DRAWINGS

One or more embodiments of the present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
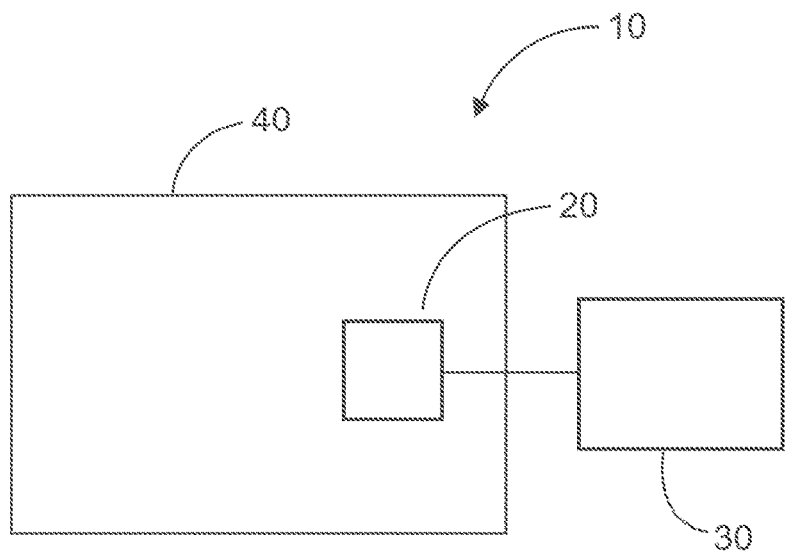
FIG. 1 shows a schematic representation of an exemplar system for monitoring a circuit breaker.

In a first aspect, there is provided a system for monitoring a circuit breaker. The system comprises:

at least one sensor; and a processing unit.

The at least one sensor is configured to be located and utilized to obtain at least one sensor data of a main shaft of an operational circuit breaker. The at least one sensor is configured to provide the at least one sensor data of the main shaft of the operational circuit breaker to the processing unit. The processing unit is configured to determine position and/or velocity information for a moveable contact of the operational circuit breaker, wherein the determination comprises analysis of the at least one sensor data of the main shaft of the operational circuit breaker by a trained neural network implemented by the processing unit.

In an example, the neural network was trained on the basis of at least one sensor data of a main shaft of a calibration circuit breaker and at least one sensor data of a moveable contact and/or pushrod of the calibration circuit breaker.

In an example, the at least one sensor data of the main shaft of the calibration circuit breaker was acquired at the same time as the at least one sensor data of the moveable contact and/or pushrod of the calibration circuit breaker.

In an example, the calibration circuit breaker was the same type or model as the operational circuit breaker.

In an example, at least one sensor utilized to obtain the at least one sensor data of the main shaft of the calibration circuit breaker was the same type or model as the at least one sensor utilized to obtain the at least one sensor data of the main shaft of the operational circuit breaker.

In an example, at least one sensor utilized to obtain the at least one sensor data of the main shaft of the calibration circuit breaker was located at the same or equivalent at least one location as the at least one sensor utilized to obtain the at least one sensor data of the main shaft of the operational circuit breaker.

In an example, the at least one sensor utilized to obtain the at least one sensor data of the main shaft of the operational circuit breaker comprises one or more of: acceleration sensor; main shaft angle sensor.

In an example, the at least one sensor utilized to obtain the at least one sensor data of the moveable contact and/or pushrod of the calibration circuit breaker comprises one or more of: position sensor; velocity sensor.

In an example, the position information and/or the velocity information for the moveable contact comprises a travel curve.

In an example, the system comprises an output unit configured to output the position information and/or the velocity information for the moveable contact.

In an example, the processing unit is configured to determine if the circuit breaker has a fault, wherein the determination comprises analysis of the position information and/or the velocity information for the moveable contact.

In a second aspect, there is provided a system for monitoring a two or three phase switchgear or control gar. The system comprises two or three systems according to the first aspect, one for a circuit breaker of each of the two or three phases.

In a third aspect, there is provided a method for monitoring a circuit breaker, the method comprising:

a) utilizing at least one sensor located to obtain at least one sensor data of a main shaft of an operational circuit breaker;

b) providing the at least one sensor data of the main shaft of the operational circuit breaker to a processing unit; and c) determining by the processing unit position and/or velocity information for a moveable contact of the operational circuit breaker, wherein the determining comprises analysing the at least one sensor data of the main shaft of the operational circuit breaker by a trained neural network implemented by the processing unit.

In a fourth aspect, there is provided a system for training a neural network for monitoring a circuit breaker, the system comprising:

at least one first sensor;

at least one second sensor; and a processing unit.

The at least one first sensor is configured to be located and utilized to obtain at least one sensor data of a main shaft of a calibration circuit breaker. The at least one first sensor is configured to provide the at least one sensor data of the main shaft of the calibration circuit breaker to the processing unit. The at least one second sensor is configured to be located and utilized to obtain at least one sensor data of a moveable contact and/or pushrod of the calibration circuit breaker. The at least one second sensor is configured to provide the at least one sensor data of the moveable contact and/or pushrod of the calibration circuit breaker to the processing unit. The processing unit is configured to train a neural network. The training of the neural network comprises utilization of the at least one sensor data of the main shaft of the calibration circuit breaker and the at least one sensor data of the moveable contact and/or pushrod of the calibration circuit breaker. The trained neural network is configured to determine position and/or velocity information for a moveable contact of an operational circuit breaker on the basis of analysis of at least one sensor data of a main shaft of the operational circuit breaker.

In a fifth aspect, there is provided a method for training a neural network for monitoring a circuit breaker, the method comprising:

a1) utilizing at least one first sensor located to obtain at least one sensor data of a main shaft of a calibration circuit breaker;

b1) providing the at least one sensor data of the main shaft of the calibration circuit breaker to a processing unit;

c1) utilizing at least one second sensor located to obtain at least one sensor data of a moveable contact and/or pushrod of the calibration circuit breaker;

d1) providing the at least one sensor data of the moveable contact and/or pushrod of the calibration circuit breaker to the processing unit; and e1) training by the processing unit a neural network, wherein the training of the neural network comprises utilizing the at least one sensor data of the main shaft of the calibration circuit breaker and the at least one sensor data of the moveable contact and/or pushrod of the calibration circuit breaker, and wherein the trained neural network is configured to determine position and/or velocity information for a moveable contact of an operational circuit breaker on the basis of analysis of at least one sensor data of a main shaft of the operational circuit breaker.

The above aspects and examples will become apparent from and be elucidated with reference to the embodiments described hereinafter.

FIG. 1 shows an example of a system 10 for monitoring a circuit breaker. The system comprises at least one sensor 20, and a processing unit 30. The at least one sensor is configured to be located and utilized to obtain at least one sensor data of a main shaft of an operational circuit breaker 40. The at least one sensor is configured to provide the at least one sensor data of the main shaft of the operational circuit breaker to the processing unit. The processing unit is configured to determine position and/or velocity information for a moveable contact of the operational circuit breaker. The determination comprises analysis of the at least one sensor data of the main shaft of the operational circuit breaker by a trained neural network implemented by the processing unit. The trained neural network may be an artificial intelligence model that indicates a network of nodes that are used for predictive modeling. The trained neural network may be trained using one or more datasets.

According to an example, the neural network was trained on the basis of at least one sensor data of a main shaft of a calibration circuit breaker 50 and at least one sensor data of a moveable contact and/or pushrod of the calibration circuit breaker.

According to an example, the at least one sensor data of the main shaft of the calibration circuit breaker was acquired at the same time as the at least one sensor data of the moveable contact and/or pushrod of the calibration circuit breaker.

According to an example, the calibration circuit breaker was the same type or model as the operational circuit breaker.

According to an example, at least one sensor 20, 60 utilized to obtain the at least one sensor data of the main shaft of the calibration circuit breaker was the same type or model as the at least one sensor 20 utilized to obtain the at least one sensor data of the main shaft of the operational circuit breaker.

According to an example, at least one sensor utilized to obtain the at least one sensor data of the main shaft of the calibration circuit breaker was located at the same or equivalent at least one location as the at least one sensor utilized to obtain the at least one sensor data of the main shaft of the operational circuit breaker.

According to an example, the at least one sensor utilized to obtain the at least one sensor data of the main shaft of the operational circuit breaker comprises one or more of: acceleration sensor; main shaft angle sensor.

According to an example, the at least one sensor 70 utilized to obtain the at least one sensor data of the moveable contact and/or pushrod of the calibration circuit breaker comprises one or more of: position sensor; velocity sensor.

According to an example, the position information and/or the velocity information for the moveable contact comprises a travel curve.

According to an example, the system comprises an output unit configured to output the position information and/or the velocity information for the moveable contact.

According to an example, the processing unit is configured to determine if the circuit breaker has a fault. The determination comprises analysis of the position information and/or the velocity information for the moveable contact.

Figure 2:
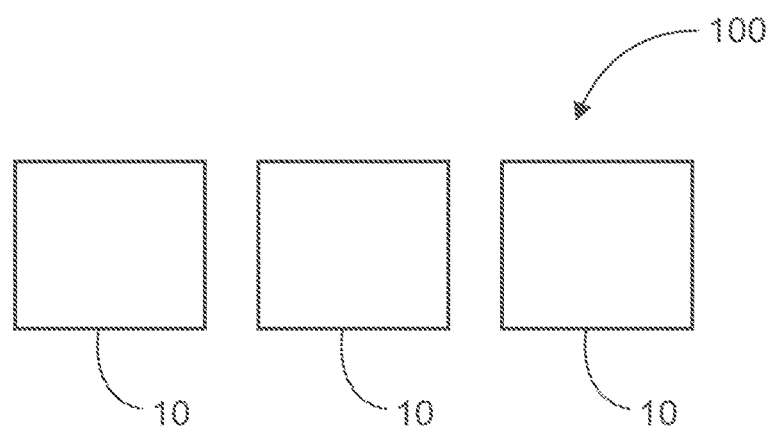
FIG. 2 shows a schematic representation of an exemplar system for monitoring a two or three phase switchgear or control gear.

FIG. 2 shows an example of a system 100 for monitoring a two or three phase switchgear or control gear. The system comprises two or three systems 10 as described above with respect to FIG. 1, where one of the systems 10 is used for a circuit breaker of each of the two or three phases.

Figure 3:
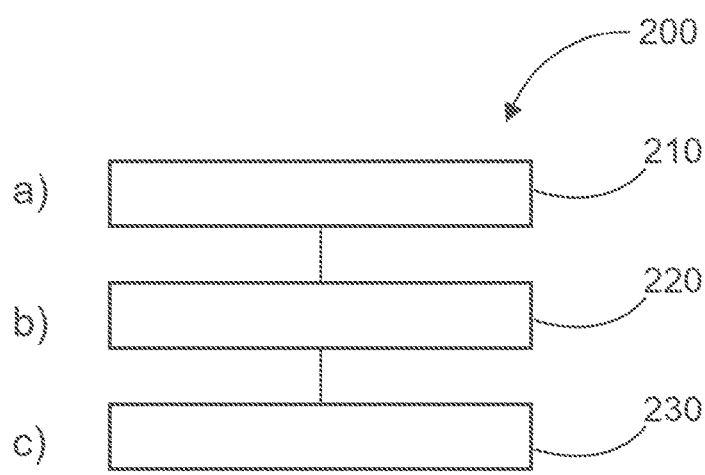
FIG. 3 shows a method for monitoring a circuit breaker.

FIG. 3 shows a method 200 for monitoring a circuit breaker in its basic steps. The method comprises:

in a utilizing step 210, also referred to as step a), utilizing at least one sensor located to obtain at least one sensor data of a main shaft of an operational circuit breaker;

in a providing step 220, also referred to as step b), providing the at least one sensor data of the main shaft of the operational circuit breaker to a processing unit; and in a determining step 230, also referred to as step c), determining by the processing unit position and/or velocity information for a moveable contact of the operational circuit breaker, wherein the determining comprises analysing the at least one sensor data of the main shaft of the operational circuit breaker by a trained neural network implemented by the processing unit.

In an example, the neural network was trained on the basis of at least one sensor data of a main shaft of a calibration circuit breaker and at least one sensor data of a moveable contact and/or pushrod of the calibration circuit breaker.

In an example, the at least one sensor data of the main shaft of the calibration circuit breaker was acquired at the same time as the at least one sensor data of the moveable contact and/or pushrod of the calibration circuit breaker.

In an example, the calibration circuit breaker was the same type or model as the operational circuit breaker.

In an example, at least one sensor utilized to obtain the at least one sensor data of the main shaft of the calibration circuit breaker was the same type or model as the at least one sensor utilized to obtain the at least one sensor data of the main shaft of the operational circuit breaker.

In an example, at least one sensor utilized to obtain the at least one sensor data of the main shaft of the calibration circuit breaker was located at the same or equivalent at least one location as the at least one sensor utilized to obtain the at least one sensor data of the main shaft of the operational circuit breaker.

In an example, the at least one sensor utilized to obtain the at least one sensor data of the main shaft of the operational circuit breaker comprises one or more of: acceleration sensor; main shaft angle sensor.

In an example, the at least one sensor utilized to obtain the at least one sensor data of the moveable contact and/or pushrod of the calibration circuit breaker comprises one or more of: position sensor; velocity sensor.

In an example, the position information and/or the velocity information for the moveable contact comprises a travel curve.

In an example, the system comprises an output unit and the method comprises outputting the position information and/or the velocity information for the moveable contact.

In an example, the method comprises determining by the processing unit if the circuit breaker has a fault, wherein the determining comprises analysing the position information and/or the velocity information for the moveable contact.

Figure 4:
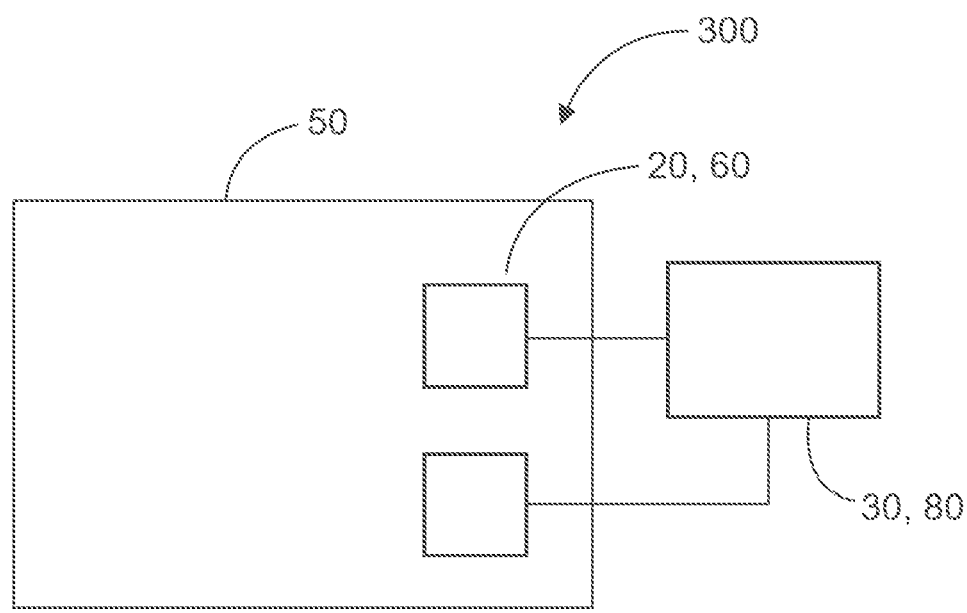
FIG. 4 shows a schematic representation of an exemplar system for training a neural network for monitoring a circuit breaker.

FIG. 4 shows an example of a system 300 for training a neural network for monitoring a circuit breaker. The system comprises at least one first sensor 20, 60, at least one second sensor 70, and a processing unit 30, 80. The at least one first sensor is configured to be located and utilized to obtain at least one sensor data of a main shaft of a calibration circuit breaker 50. The at least one first sensor is configured to provide the at least one sensor data of the main shaft of the calibration circuit breaker to the processing unit. The at least one second sensor is configured to be located and utilized to obtain at least one sensor data of a moveable contact and/or pushrod of the calibration circuit breaker. The at least one second sensor is configured to provide the at least one sensor data of the moveable contact and/or pushrod of the calibration circuit breaker to the processing unit. The processing unit is configured to train a neural network. The training of the neural network comprises utilization of the at least one sensor data of the main shaft of the calibration circuit breaker and the at least one sensor data of the moveable contact and/or pushrod of the calibration circuit breaker. The trained neural network is configured to determine position and/or velocity information for a moveable contact of an operational circuit breaker 40 on the basis of analysis of at least one sensor data of a main shaft of the operational circuit breaker.

In an example, the at least one sensor data of the main shaft of the calibration circuit breaker was acquired at the same time as the at least one sensor data of the moveable contact and/or pushrod of the calibration circuit breaker.

In an example, the calibration circuit breaker is the same type or model as for the operational circuit breaker.

In an example, the at least one first sensor (20, 60) utilized to obtain the at least one sensor data of the main shaft of the calibration circuit breaker is the same type or model as at least one sensor (20) that will be utilized to obtain the at least one sensor data of the main shaft of the operational circuit breaker.

In an example, the at least one first sensor utilized to obtain the at least one sensor data of the main shaft of the calibration circuit breaker is located at the same or equivalent at least one location as the at least one sensor that will be utilized to obtain the at least one sensor data of the main shaft of the operational circuit breaker.

In an example, the at least one first sensor utilized to obtain the at least one sensor data of the main shaft of the calibration circuit breaker comprises one or more of: acceleration sensor; main shaft angle sensor.

In an example, the at least one second sensor (70) utilized to obtain the at least one sensor data of the moveable contact and/or pushrod of the calibration circuit breaker comprises one or more of: position sensor; velocity sensor.

In an example, the position information and/or the velocity information for the moveable contact comprises a travel curve.

Figure 5:
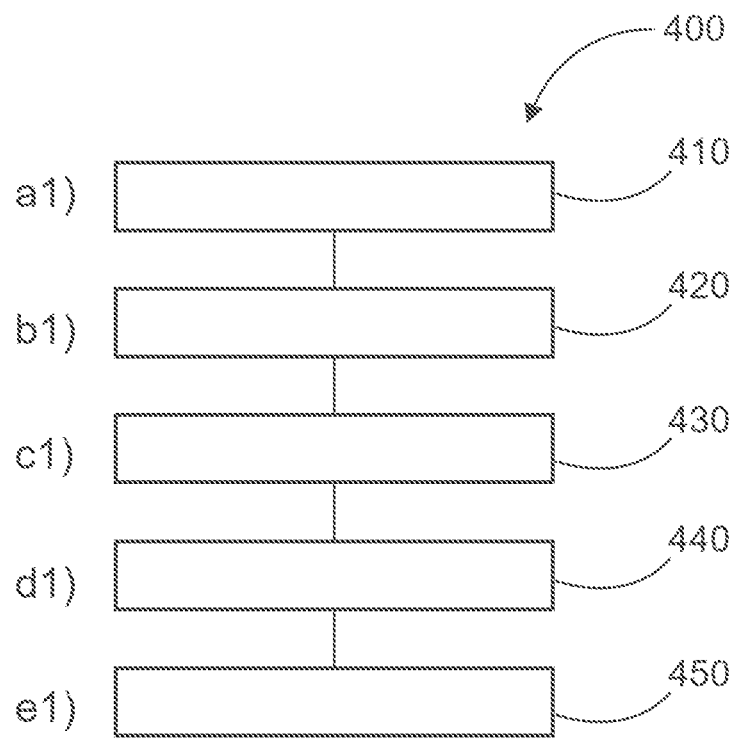
FIG. 5 shows a method for training a neural network for monitoring a circuit breaker.

FIG. 5 shows a method 400 for training a neural network for monitoring a circuit breaker in its basic steps. The method comprises:

in a utilizing step 410, also referred to as step a1), utilizing at least one first sensor located to obtain at least one sensor data of a main shaft of a calibration circuit breaker;

in a providing step 420, also referred to as step b1), providing the at least one sensor data of the main shaft of the calibration circuit breaker to a processing unit;

in a utilizing step 430, also referred to as step c1), utilizing at least one second sensor located to obtain at least one sensor data of a moveable contact and/or pushrod of the calibration circuit breaker;

in a providing step 440, also referred to as step d1), providing the at least one sensor data of the moveable contact and/or pushrod of the calibration circuit breaker to the processing unit; and in a training step 450, also referred to as step e1), training by the processing unit a neural network. The training of the neural network comprises utilizing the at least one sensor data of the main shaft of the calibration circuit breaker and the at least one sensor data of the moveable contact and/or pushrod of the calibration circuit breaker. The trained neural network is configured to determine position and/or velocity information for a moveable contact of an operational circuit breaker on the basis of analysis of at least one sensor data of a main shaft of the operational circuit breaker.

In an example, the method comprises acquiring at least one sensor data of the main shaft of the calibration circuit breaker at the same time as the at least one sensor data of the moveable contact and/or pushrod of the calibration circuit breaker.

In an example, the calibration circuit breaker is the same type or model as for the operational circuit breaker.

In an example, the at least one first sensor (20, 60) utilized to obtain the at least one sensor data of the main shaft of the calibration circuit breaker is the same type or model as at least one sensor (20) that will be utilized to obtain the at least one sensor data of the main shaft of the operational circuit breaker.

In an example, the at least one first sensor utilized to obtain the at least one sensor data of the main shaft of the calibration circuit breaker is located at the same or equivalent at least one location as the at least one sensor that will be utilized to obtain the at least one sensor data of the main shaft of the operational circuit breaker.

In an example, the at least one first sensor utilized to obtain the at least one sensor data of the main shaft of the calibration circuit breaker comprises one or more of: acceleration sensor; main shaft angle sensor.

In an example, the at least one second sensor (70) utilized to obtain the at least one sensor data of the moveable contact and/or pushrod of the calibration circuit breaker comprises one or more of: position sensor; velocity sensor.

In an example, the position information and/or the velocity information for the moveable contact comprises a travel curve.

Figure 6:
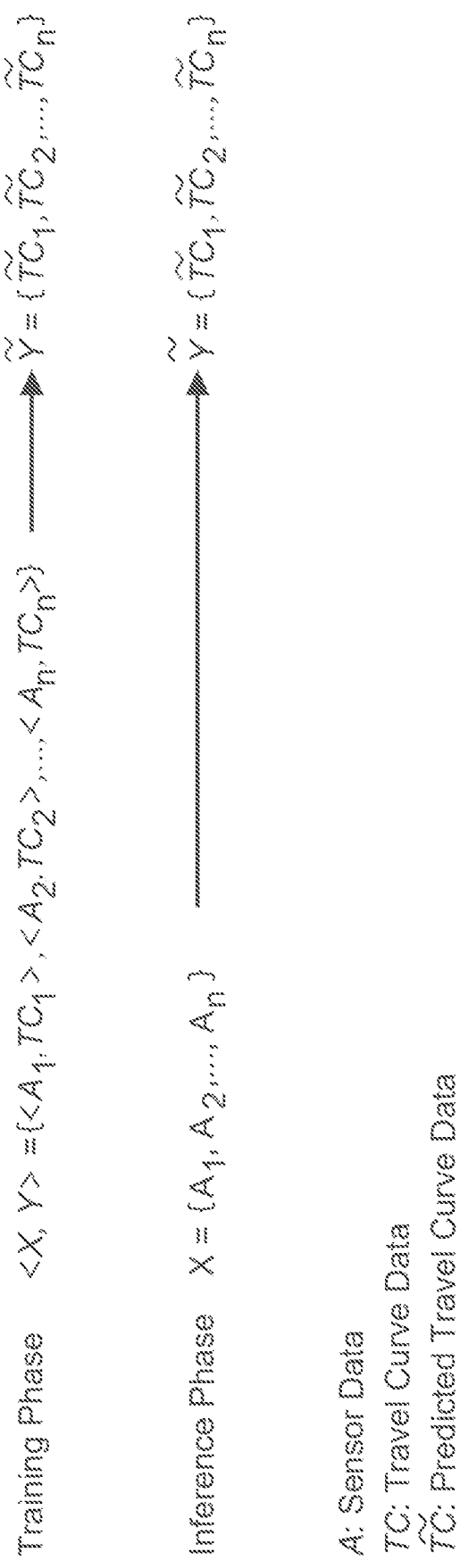
FIG. 6 shows a workflow for training of the neural network.

The system for monitoring a circuit breaker, system for monitoring a two or three phase switchgear or controlgear, method for monitoring a circuit breaker, system for training a neural network for monitoring a circuit breaker, and method for training a neural network for monitoring a circuit breaker and now described in specific detail, where reference is made to FIG. 6.

The condition monitoring and diagnosis of the operating mechanism of a circuit breaker (CB) is mainly based on travel curve measurements. The reason is that most of the failure modes can be captured by position or velocity sensors measuring the travel curve. However, acquiring such data is hard to achieve as it requires robust, reliable sensors fulfilling the requirements in installation space and lifetime of the CB.

The inventors realised that other types of sensors such as accelerometers that are more appropriate and can be easier to mount in the CB can be utilized in a completely different way and new way in order to derive this travel curve information. The inventors have applied methods of artificial intelligence (AI) for extracting the position of the moving contact for each pole from this other sensor data (for example the accelerometers), and thus enabling CB drive monitoring based on travel curves. In addition to the mechanical failures, the generated travel curves can be also used to monitor electrical failure modes as for instance contact ablation.

The solution involves using a sequence-to-sequence artificial intelligence (AI) model that first learns to generate the travel curve data from the other sensor data by training it with examples that contain both travel curve and further sensor measurements, e.g. accelerometers, rotary encoders for measuring the main shaft angle, etc.

Subsequently, the model is able to extract travel curve information also on data that was not used for the training of the model, and when the travel curve information is not available. The accuracy of this method is evaluated in two ways:

1. Comparing the generated travel curves with the actual travel curves using data that was not used in the training of the model, and using all samples, e.g. using the squared error averaged across all samples.

2. By calculating features that describe characteristics of the travel curve that are important for health diagnostics and are known from the scientific literature, and comparing the features calculated using the generated travel curves and those calculated using the actual travel curves, using data that was not used in the training of the model.

Thus the solution utilizes a dataset with both travel curve signals and further sensor data, which were recorded simultaneously from the same device. Then use an artificial intelligence (AI) model is used to learn to generate the travel curves from the further sensor data (that was acquired at the same time as the travel curve signals) which could be accelerometer signals, angle measurements of the main shaft, etc.

Subsequently, the model is used to extract travel curve information also on data that was not used for the training of the model, and when the travel curve information is not available. Thus, travel curve data can be generated only for the "further sensor data" such as from accelerometers that can be more convenient placed and used, for a new circuit breaker of the same type or model as that used for generating the neural network model.

Thus, after the model is trained, the model can be used to diagnose the health of circuit breaker drives using only the measurement data from other sensors.

FIG. 6 provides an overview work flow of the above described technique.

While one or more embodiments of the invention have been illustrated and described in detail in the drawings and foregoing description, such illustration and description are to be considered illustrative or exemplary and not restrictive. The invention is not limited to the disclosed embodiments.

Other variations to the disclosed embodiments can be understood and effected by those skilled in the art in practicing a claimed invention, from a study of the drawings, the disclosure, and the dependent claims.

While one or more embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A system for monitoring an operational circuit breaker, the system comprising:
    at least one sensor; and
    a processor;
    wherein the at least one sensor is configured to be located and utilized to obtain at least one sensor data of a main shaft of the operational circuit breaker;
    wherein the at least one sensor is configured to provide the at least one sensor data of the main shaft of the operational circuit breaker to the processor;
    wherein the processor is configured to analyze the at least one sensor data of the main shaft of the operational circuit breaker using a trained neural network to determine position and/or velocity information for a movable contact of the operational circuit breaker, and wherein the trained neural network is an artificial intelligence model that indicates a network of nodes that are used for predictive modeling and was trained using one or more datasets.

2. The system according to claim 1, wherein the neural network was trained on the basis of at least one sensor data of a main shaft of a calibration circuit breaker and at least one sensor data of a moveable contact and/or pushrod of the calibration circuit breaker.

3. The system according to claim 2, wherein the at least one sensor data of the main shaft of the calibration circuit breaker was acquired at the same time as the at least one sensor data of the moveable contact and/or pushrod of the calibration circuit breaker.

4. The system according to claim 2, wherein the calibration circuit breaker was the same type or model as the operational circuit breaker.

5. The system according to claim 2, wherein at least one sensor utilized to obtain the at least one sensor data of the main shaft of the calibration circuit breaker was the same type or model as the at least one sensor utilized to obtain the at least one sensor data of the main shaft of the operational circuit breaker.

6. The system according to claim 2, wherein at least one sensor utilized to obtain the at least one sensor data of the main shaft of the calibration circuit breaker is located at the same or equivalent at least one location as the at least one sensor utilized to obtain the at least one sensor data of the main shaft of the operational circuit breaker.

7. The system according to claim 1, wherein the at least one sensor utilized to obtain the at least one sensor data of the main shaft of the operational circuit breaker comprises one or more of: acceleration sensor; main shaft angle sensor.

8. The system according to claim 2, wherein the at least one sensor utilized to obtain the at least one sensor data of the moveable contact and/or pushrod of the calibration circuit breaker comprises one or more of: position sensor; velocity sensor.

9. The system according to claim 1, wherein the position information and/or the velocity information for the moveable contact comprises a travel curve.

10. The system according to claim 1, wherein the system comprises an outputter configured to output the position information and/or the velocity information for the moveable contact.

11. The system according to claim 1, wherein the processor is configured to determine if the operational circuit breaker has a fault, wherein the determination comprises analysis of the position information and/or the velocity information for the moveable contact.

12. A system for monitoring a two or three phase switchgear or control gear, the system comprising two or three systems according to claim 1, one for a circuit breaker of each of the two or three phases.

13. A method for monitoring an operational circuit breaker, the method comprising:
utilizing at least one sensor located to obtain at least one sensor data of a main shaft of the operational circuit breaker;
providing the at least one sensor data of the main shaft of the operational circuit breaker to a processor; and
analyzing, by the processor, the at least one sensor data of the main shaft of the operational circuit breaker using a trained neural network to determine position and/or velocity information for a movable contact of the operational circuit breaker, and wherein the trained neural network is an artificial intelligence model that indicates a network of nodes that are used for predictive modeling and is trained using one or more datasets.

14. A system for training a neural network for monitoring an operational circuit breaker, the system comprising:
at least one first sensor;
at least one second sensor; and
a processor;
wherein the at least one first sensor is configured to be located and utilized to obtain at least one sensor data of a main shaft of a calibration circuit breaker;
wherein the at least one first sensor is configured to provide the at least one sensor data of the main shaft of the calibration circuit breaker to the processor;
wherein the at least one second sensor is configured to be located and utilized to obtain at least one sensor data of a moveable contact and/or pushrod of the calibration circuit breaker;
wherein the at least one second sensor is configured to provide the at least one sensor data of the moveable contact and/or pushrod of the calibration circuit breaker to the processor; and
wherein the processor is configured to train a neural network, wherein the training of the neural network comprises utilization of the at least one sensor data of the main shaft of the calibration circuit breaker and the at least one sensor data of the moveable contact and/or pushrod of the calibration circuit breaker, wherein the trained neural network is an artificial intelligence model that indicates a network of nodes that are used for predictive modeling, and wherein at least one sensor data of a main shaft of the operational circuit breaker is analyzed using the trained neural network to determine position and/or velocity information for a movable contact of the operational circuit breaker.

15. A method for training a neural network for monitoring an operational circuit breaker, the method comprising:
utilizing at least one first sensor located to obtain at least one sensor data of a main shaft of a calibration circuit breaker;
providing the at least one sensor data of the main shaft of the calibration circuit breaker to a processor;
utilizing at least one second sensor located to obtain at least one sensor data of a moveable contact and/or pushrod of the calibration circuit breaker;
providing the at least one sensor data of the moveable contact and/or pushrod of the calibration circuit breaker to the processor; and
training, by the processor, a neural network, wherein the training of the neural network comprises utilizing the at least one sensor data of the main shaft of the calibration circuit breaker and the at least one sensor data of the moveable contact and/or pushrod of the calibration circuit breaker, wherein the trained neural network is an artificial intelligence model that indicates a network of nodes that are used for predictive modeling; and wherein at least one sensor data of a main shaft of the operational circuit breaker is analyzed using the trained neural network to determine position and/or velocity information for a movable contact of the operational circuit breaker.

16. The system according to claim 1, wherein analyzing the at least one sensor data of the main shaft of the operational circuit breaker using the trained neural network to determine the position and/or velocity information for the movable contact of the operational circuit breaker comprises:
inputting the at least one sensor data of the main shaft of the operational circuit breaker into the trained neural network to generate the position and/or the velocity information indicating one or more positions or velocities of the movable contact.

* * * * *